United States Patent [19]
Sheppard

[11] 3,726,315
[45] Apr. 10, 1973

[54] MAGNETIC VALVE

[75] Inventor: William L. Sheppard, Romulus, Mich.

[73] Assignee: Mechanical Products, Division of Aiken Industries, Inc., Jackson, Mich.

[22] Filed: Sept. 28, 1970

[21] Appl. No.: 76,652

Related U.S. Application Data

[63] Continuation-in-part of Ser. No. 32,140, April 27, 1970, abandoned.

[52] U.S. Cl. ............... 137/625.65, 251/84, 251/86, 251/141, 251/357, 251/77
[51] Int. Cl. ....................... F16k 31/02, F16k 11/04
[58] Field of Search.......................251/129, 141, 84, 251/86, 77, 357; 137/625.64, 625.65, 596.16, 596.17

[56] References Cited

UNITED STATES PATENTS

| | | | |
|---|---|---|---|
| 1,034,370 | 7/1912 | McCarty | 251/86 |
| 2,374,895 | 5/1945 | Ray | 251/141 |
| 2,750,962 | 6/1956 | Kreitchman et al. | 251/84 X |
| 2,828,936 | 4/1958 | Hales | 251/86 |
| 3,549,119 | 12/1970 | Sellers | 251/129 X |
| 2,294,421 | 9/1942 | Ray | 251/141 |
| 2,612,907 | 10/1952 | Harris | 251/129 |
| 2,914,034 | 11/1959 | Becker | 137/625.65 |
| 3,422,850 | 1/1969 | Caldwell | 137/625.65 |

FOREIGN PATENTS OR APPLICATIONS

| | | | |
|---|---|---|---|
| 1,183,324 | 1/1959 | France | 251/357 |
| 750,869 | 6/1956 | Great Britain | 137/625.65 |

*Primary Examiner*—Henry T. Klinksiek
*Attorney*—Harness, Dickey & Pierce

[57] ABSTRACT

A magnetically operated valve having a resilient flat surfaced valve member cooperating with a valve seat. The resilient member is mounted on an armature in a manner to permit relative motion therebetween to allow the armature to gain a predetermined inertia prior to engaging the resilient member so as to aid in overcoming the pressure differential across the resilient member. Additionally, the electromagnet thereof acts unevenly on the armature so as to cause a "prying" movement of the resilient member from the valve seat. The valve may be operated in the normally-open or the normally-closed mode.

11 Claims, 3 Drawing Figures

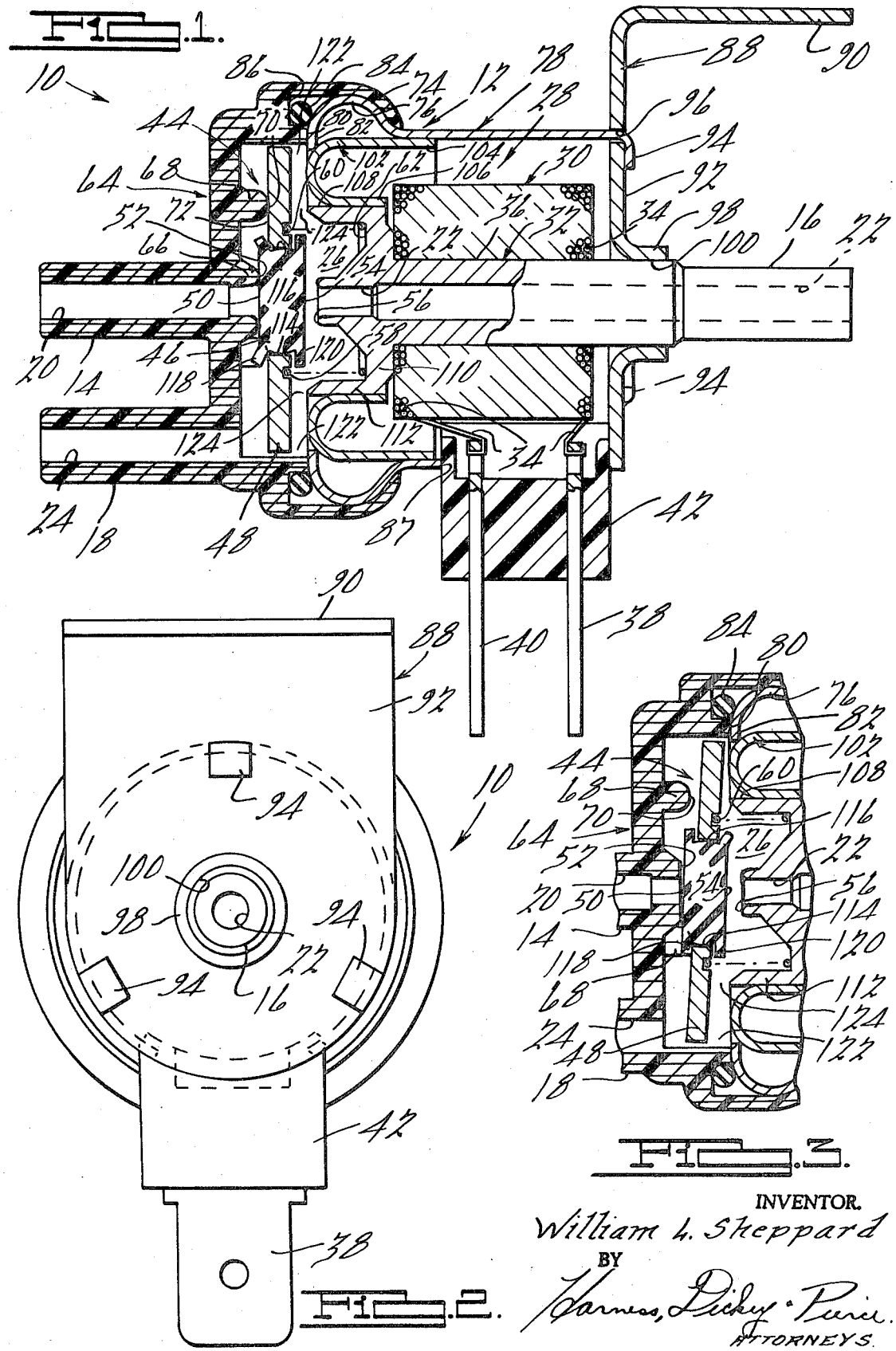

MAGNETIC VALVE

This application is a continuation-in-part of application Ser. No. 32,140, filed Apr. 27, 1970, and now abandoned.

BACKGROUND OF THE INVENTION

1. Field of the Invention

This invention relates generally to gas (particularly, air) valves, and more specifically, to magnetically-operated gas valves.

2. Description of the Prior Art

Ideally, a magnetically-operated valve should be compact, reliable, and capable of inexpensive manufacture. Prior art magnetic valves commonly use a movable needle having a resilient conical end cooperating with a conical valve seat such that insertion of the needle into the valve seat causes fluid-tight engagement of the conical surfaces thereof. It will be appreciated that needle-type valves require precise alignment between the needle and the opening therefore which contributes to relatively high manufacturing costs, and furthermore, adversely affects the reliability and longevity of the valves in use.

Any misalignment occurring by virtue of inherent manufacturing tolerances must be compensated for by using relatively strong springs to forcibly urge the needle into a fully seated conditions, and additionally, misalignment may cause binding between the needle and valve seat, each of these conditions thereby placing commensurate demands upon the electromagnet if it is to unseat the needle in opposition to the relatively heavy springs and binding effects. Additionally, since a portion of the conical needle end extends into the opening, even after unseating of the needle, a relatively high lift or separation of the needle from the opening is required to permit restriction-free flow therethrough. This requirement for a high needle lift or excursion imposes an additional demand upon the electromagnet.

From a cost standpoint, it is highly desirable to minimize the demand made on the electromagnet so as to minimize the number of ampere-turns required. More particularly, the conductors utilized are generally of a highly conductive material, such as copper or aluminum, which are quite expensive. Therefore, it is desirable, from a cost standpoint, to limit the use thereof. It can be seen then that the high lift requirement and the binding propensity of needle-type valves contribute significantly to the costs of a magnetic valve by requiring a relatively high number of ampere-turns.

SUMMARY OF THE INVENTION

The present invention provides an improved magnetic valve which is simple in construction, reliable, and most importantly, requires fewer ampere-turns in its electromagnet than prior art competitive magnetic valves. More specifically, an exemplary magnetic valve according to this invention is provided with a movable valve element having a portion of magnetic material and including a flat surface portion cooperating with a valve seat. The implementation of a flat surfaced movable valve element allows unrestricted flow through the valve with smaller amounts of valve member lift or excursion than that required with competitive prior art devices. For example, the movable valve element may comprise a resilient member having a substantially flat surface portion for engaging the valve seat, and an armature member constructed of magnetic material on which the resilient member is mounted. The resilient member is mounted on the armature member in a manner to provide a predetermined relative movement therebetween so that the armature member may develop an initial velocity upon actuation of the valve prior to its acting upon the resilient member so that its inertia will overcome the seating force established by the pressure differential across the valve.

A synergistic effect is achieved since the electromagnet will act unevenly on the armature member due to purposeful or inherent tolerance variations in the valve causing an uneven lifting of the armature which prys or peels the resilient member from the valve seat. Due to the combined result of the low excursion requirement, the inertia effect of the armature member, and the "prying" or "peeling" effect, a significantly lower magnetic flux density is required, and accordingly, the number of ampere-turns within the electromagnet are fewer than those of the competitive prior art devices of like purpose. As a consequence, a significant cost savings is achieved. As a still additional advantage provided by this invention, the alignment between the movable valve element and the valve seat is not critical, and accordingly, assembly is economically and easily accomplished, tolerances are not critical, and dimensional variations due to wear have a minimal effect on the reliability and longevity of the device.

BRIEF DESCRIPTION OF THE DRAWINGS

FIG. 1 is a side cross-sectional view of an exemplary embodiment of a magnetic valve according to this invention;

FIG. 2 is an end view of the magnetic valve of FIG. 1; and

FIG. 3 is a partial side cross-sectional view of the magnetic valve of FIG. 1 illustrating the operation thereof.

DETAILED DESCRIPTION OF THE PREFERRED EMBODIMENT

In FIGS. 1–3, an exemplary magnetic valve 10 according to the present invention is illustrated. Referring now particularly to FIG. 1, the magnetic valve 10 has a housing assembly indicated generally as 12 and three tube fittings or nipples 14, 16 and 18, each having a cylindrical flow opening 20, 22 and 24, respectively. The opening 24 communicates with a central chamber 26 within the housing 12 at all times whereas the openings 20 and 22 communicate with the central chamber 26 at selected times to be described more particularly below. The magnetic valve 10 further has an electromagnet interior the housing 12 indicated generally at 28 which comprises a coil 30 and a core 32. The coil 30 has a number of turns or convolutions of a conductor 34 (fewer ampere-turns than those of competitive prior art magnetic valves of like utility) about a stem portion 36 of the core 32. The conductor 34 is connected at one end thereof to a first terminal 38 which extends exterior the housing 12, and at the other end to a second terminal 40, also extending exterior the housing 12. The terminals 38 and 40 are mounted in an insulating block 42, which constitutes one part of the housing 12, which is adapted to position the terminals 38 and 40 for convenient electrical connection.

The magnetic valve 10 further including a movable valve element or assembly, indicated generally at 44, consisting of a resilient member 46, of rubber or other elastomeric material or the like, and an armature member 48 constructed of a magnetic material, i.e. a material having low reluctance to magnetic flux such as iron, steel, or other suitable ferromagnetic material. The resilient member 46 has a first substantially flat surface portion 50 which is adapted to sealingly engage a first valve seat 52 at the interior end of the opening 20 when the movable valve assembly 44 is in the extreme leftward position as shown. The resilient member 46 has a second substantially flat surface portion 54 which is adapted to sealingly engage a second valve seat 56 when the movable valve assembly 44 is in the extreme rightward position. As can be seen in FIG. 1, the cylindrical opening 22 extends axially from the fitting 16 through the stem portion 36 to the valve seat 56. The movable valve assembly 44 is resiliently biased to the left by a light, coiled-spring member 58 which engages an annular groove 60 in the armature member 48 at its one end and abuts the surface 62 of the core 32 at its other end so as to be prestressed in compression.

It can now be seen that a fluid path is provided from the opening 20 to the opening 24 by the valve seat 52. Moreover, the flow of fluid by the valve seat 52 may be restrictively influenced or terminated by seating the substantially flat surface portion 50 of the resilient member 46 on the valve seat 52. Accordingly, seating of the flat surface portion 50 on the valve seat 52 restricts or terminates fluid flow through the magnetic valve 10 from opening 24 to opening 20. Similarly, a fluid path is provided from the opening 22, by the valve seat 56, to the opening 24. Moreover, the fluid flow by the valve seat 56 is restrictively influenced or terminated by seating the substantially flat surface portion 54 on the valve seat 56 to restrict or terminate flow through the valve 10 from opening 22 to opening 20.

The housing assembly 12 has an end cap assembly 64 which preferably is integrally molded of nylon or other plastic material. As can be seen in FIG. 1, the end cap assembly 64 includes tube fittings 14 and 18, as well as the first valve seat 52. The valve seat 52 is preferably centrally disposed and is formed by an elevated radiused annular projection 66 as shown. The end cap 64 has three rounded armature support projections 68 (one not shown) which are circumferentially equally-spaced and which project a predetermined distance with respect to the valve seat 52 as will be described in greater detail hereinafter.

The end cap 64 additionally includes a rounded inwardly-extending lip portion 74 which engages an outwardly curved left end portion 76 of a cylindrical body 78 so as to secure the end cap 64 to the body 78. A projection 80 on the end cap 64 engages an inwardly extending flange 82 on the curved left end portion 76 of the cylindrical body 78 so as to provide an axial engaging force between the curved lip 74 and the curved end portion 76 of the cylindrical body 78 thereby establishing a fluid seal therebetween. An additional fluid seal between the end cap 64 and the cylindrical body 78 is provided by an O-ring 84 residing in a groove 86 therefor in the end cap 64. The O-ring 84 forcibly engages the end cap 64 and the curved end portion 76 of the cylindrical body 78 by virtue of its distension while in place as shown. The preferred method of assembling the end cap 64 to the cylindrical body 78 includes the steps of inserting the O-ring 84 in the groove 86 and placing the end cap 64 on the cylindrical body 78. The lip 74 is initially axially extending rather than curved as shown. The lip 74 is curved over the end portion 76 of the cylindrical body 78 by applying heat and radially inward force thereto, for example, by a spinning operation utilizing a formed spinning tool which heats the material through friction.

The cylindrical body 78 is formed of a magnetic material, i.e. material having a low reluctance, so as to serve as a conductor portion of a magnetic circuit to be described hereinafter. The cylindrical body 78 has a rectangular opening 87 in the side wall thereof which accepts the insulating member 42 previously described.

The housing assembly 12 also includes an end mounting bracket, indicated generally as 88, which includes a mounting flange 90 extending at a right angle with respect to an end plate portion 92. The cylindrical body 78 is fixedly secured to the end mounting bracket 88 by means of three tabs 94 extending through slots 96 in the end plate portion 92 which are inwardly bent or folded as shown in FIGS. 1 and 2. The end plate portion 92 has an annular outwardly extending flange 98 providing a bore 100 which receives and closely cooperates with the stem portion 36 of the core 32. The end mounting bracket 88 is also constructed of a magnetic material so as to constitute an additional portion of a magnetic circuit to be described later.

The housing assembly 12 further includes an annular, U-channel sealing member 102 which is constructed of a high reluctance material such as brass or the like. The U-channel member 102 has a radially outward portion 104 which engages and is preferably brazed or soldered to the inwardly extending flange 82 and the internal bore of the cylindrical body 78, and radially inward portion 106 engaging and preferably brazed or soldered to a cylindrical portion 108 of the core 32. The U-channel member 102 is resiliently prestressed in bending thereby providing an effective fluid seal between the cylindrical body 78 and the core 32 for the chamber 26.

The left end of the core 32 is provided with a radially extending web 110 and an axially extending flange 112 which is positioned in adjacent, spaced relation with respect to the armature 48. The core 32 is also constructed of a magnetic material so as to constitute yet another portion of the magnetic circuit. The armature member 48 is essentially a flat plate which is preferably circular in outer dimension and has a circular inner bore 114. As can be seen in FIG. 1, the armature 48 rests on projections 68 when the resilient member 46 is seated. The resilient member 46 is preferably circular and of H-cross section as shown so as to provide a central cylindrical portion 116 connecting left and right circular flanges 118 and 120, respectively. The flanges 118 and 120 are separated a predetermined amount which is greater than the thickness of the armature member 48 so as to permit limited relative axial movement therebetween. Furthermore, the flanges 118 and 120 are of predetermined width or thinness so as to permit limited resilient deformation as illustrated in FIG. 1 with respect to flange 118 when the flat surface portion 50 is seated on the valve seat 52 with the surface 72 of the armature member 48 also being seated on the armature support projections 68. Similarly, flange 120 will resiliently deform when the second flat surface portion 54 is mated to the second valve seat 56 and the armature member 48 is at rest on the core flange 112. To establish the above conditions, the relative heights of the armature support projections 68 and valve seat projection 66, as well as the width of the flange 118, are determined such that, when the flat surface portion 50 is in initial contact with the valve seat 52, a slight gap remains between the surface 72 of the armature member 48 and the radiused outward portion 70 of the armature support projections 68. Accordingly, continued movement of the armature member 48 towards the left under the influence of the coiled-spring member 58 causes deformation of the resilient circular flange 118 as illustrated in FIG. 1. Similarly, the relative heights of the valve seat 52 and the core flange 112, as well as the width of the flange 120, are determined to establish a like deformation of the flange 120 when the movable valve assembly 44 is seated to the right. Due to this provision, the valve assembly 44 is forcibly seated regardless of manufacturing variations.

From the foregoing description, it now can be seen that a magnetic circuit has been provided in which a low reluctance flux path is established through the radial web 110, the axial flange 112 and the stem 36 of the core 32, the end plate 92, and the cylindrical body 78 to the inwardly extending flange 82. It can be seen further that the magnetic circuit is complete through an annular axial air gap 122, the armature member 48, and a second annular axial air gap 124. In other words, the electromagnet 28 has poles 82 and 112 in the vicinity of the armature member 48 which partially bridges the air gap between the poles 82 and 112. Magnetic flux is applied to this circuit from the flux source or windings 30.

In operation, if the magnetic valve 10 is to be used in the normally-closed mode, the fitting 14 is connected to a source of elevated pressure or reduced pressure so as to create a pressure differential across the magnetic valve 10. In one of its intended uses, the fitting 14 is connected to the manifold of an automobile engine so that the opening 20 communicates with manifold vacuum. The fitting 18 is connected to a fluid pressure utilization device. For example, the fitting 18 may be connected to an air conditioning system control for an automobile, an ignition advance diaphragm of the distributor, a damper door for a heating and ventilation system, or a vent control for a fuel tank. If the magnetic valve 10 is to be operated in its normally-open mode, the source of fluid at elevated or reduced pressure is connected to the fitting 16. In either case, the unused fitting 14 or 16 may be left open so as to vent the utilization device to atmosphere when the valve is closed, or may be capped to prevent such venting. Moreover, the utilization device may be connected to two different sources by connecting each source to one of the fittings 14 and 16. Obviously, a valve according to this invention may be readily constructed which operates only in the normally-open mode or the normally-closed mode simply by providing only a single fitting 14 or 16 for connection to the vacuum or pressure source.

The magnetic valve 10 is operated or activited by delivering electrical power to the terminals 38 and 40 to provide a flow of current through the convolutions 34 and consequent generation of magnetic flux which flows through the circuit described above. As a consequence of the well known effect of the flow of magnetic flux through the air gaps 122 and 124, a force on the armature member 48 will be established tending to move the armature member 48 to the right, i.e. toward the poles 82 and 112. Due to purposeful or inherent manufacturing variations, for example, in the height of the armature support projections 68, the air gap and consequently the circumferential distribution of the flux field about the armature member 48 will not be uniform. Consequently, the force created by the electromagnet 28 will be unevenly applied to the armature member 48 tending to lift one portion thereof prior to lifting of the remaining portions. Accordingly, the initial movement of the armature member 48 will or may be an angular movement wherein the armature 48 will pivot about one or two of the armature support projections 68. This effect is regenerative, i.e. initial movement of the armature member 48 toward the poles 82 and 112 reduces the air gaps 122 and 124 thereby causing an exponential increase in flux which correspondingly exponentially increases the force tending to move that portion of the armature member 48 to the right. As will be appreciated in view of FIG. 1, initial movement of the armature member 48 is opposed only by the spring 58 since the circular flanges 118 and 120 are spaced apart more than the thickness of the armature member 48. After a predetermined limited pivotal movement of the armature, the aforementioned armature portion engages the corresponding portion of the radial lip 120 of the resilient member 46. Prior to this engagement of the resilient lip 120, the armature member 48 will obtain an initial angular velocity or impetus which provides an inertia force which is at least partially expended on the resilient member 46 to overcome the seating force caused by the pressure differential across the valve seat. A synergistic effect is achieved since only one radially outwardly portion of the resilient member 46 is being forcibly acted upon such that the initial effect of the armature engagement is to "peel" or "pry" the resilient member 46 from the valve seat 52. The initial pivotal movement of the armature member 48 and the consequent "prying" or "peeling" action can be more easily seen with reference to FIG. 3 in which a partial cross-sectional view of the magnetic valve 10 is shown in a transient state immediately after activation thereof. Note that the armature 48 is in contact with a radially outward portion of the resilient lip 120 after having undergone an initial angular movement and is consequently applying a concentrated force tending to lift, peel or pry the resilient member 46 from the valve seat 52 at only one portion thereof so as to cause an initial rush of fluid by that valve seat portion. A second regenerative effect is achieved in that the initial rush of fluid rapidly reduces the pressure differential across the valve seat 52, and correspondingly reduces the force necessary to lift the resilient member 46 from the valve seat 52. Accordingly, the momentary high force provided by the inertia of the armature 48 is applied when a momentary high force is required so as to "crack" the valve and equalize the pressure across the valve. Once the valve is "cracked" a much lower force requirement exists which can be supplied by virtue of the magnetic flux itself.

Consider now the operation of the magnetic valve 10 in the normally-open mode in which the fitting 16 is connected to a source of reduced pressure, for example, to a manifold of an automobile engine. Upon energization of the electromagnet 28, the armature 48 will be pulled fully to the right thereby sealingly engaging the second flat surface portion 54 with the second valve seat 56 so as to terminate flow by the second valve seat 56. Upon deenergization of the electromagnet 28, the armature 48 will move leftward under the influence of the spring 58. However, the flux decay is not uniform with respect to the armature 48, and accordingly, the armature 48 pivotally engages the circular flange 118 of the resilient member 46 tending to peel or pry the member 46 from the valve seat 56. During this initial movement, an inertia is acquired by the armature member 48 which aids the lifting of the resilient member 46 from the valve seat 56 against the pressure differential established by the vacuum in the opening 22. Accordingly, the limited axial movement between the armature 48 and the resilient member 46 and the pivotal movement of the armature 48 also aids in unseating the resilient member 46 when the magnetic valve 10 operates in the normally-open mode.

In the illustration of FIG. 3, it can be seen that the resilient member 46 comprises very flexible radial flanges 118 and 120 and a relatively much less flexible central portion 116. Consequently, lifting of the resilient valve member 46 is more in the nature of a "prying" effect rather than a "peeling" effect. More of a "peeling" effect can be obtained by using relatively rigid flanges (or other mounting means for member 46) and a relatively flexible central portion. If desired, any combination of flexibilities may be used to mix these effects so long as the resilient member 46 remains in operative association with the armature member 48. The combined effects of the inertia force provided by the initial movement of the armature member 48 and the pivotal movement applying a substantial force to only one radial outward portion of the resilient member 46 allows satisfactory operation of the magnetic valve 10 with a lesser flux requirement than magnetic valves currently in use. Consequently, the number of ampere-turns in the magnetic source 30, may be reduced at a significant reduction in the cost of a suitable magnetic valve. Moreover, the flat valve configuration, as opposed to a needle valve configuration, requires only small excursion of the movable valve assembly 44 with respect to the valve seat 52 to achieved minimum flow restriction by the valve seat.

Alternately, an exemplary valve within the scope of this invention may be constructed by utilizing a movable core which is connected to the plate carrying the resilient member 46 such that movement of the core in response to energization of the flux source will lift the resilient member 46 from the valve seat 52. Preferably, the connection between the movable core and the plate or the association between the plate and the resilient member 46 is askew or pivotal so as to give the "prying" action described above. For example, the member 48 may have an angulated flange to achieve the askewed association. Of course, it is preferred to provide limited relative movement between the plate and movable core or the plate and resilient member 46 to establish an initial impetus or inertia prior to lifting the resilient member 46 from the seat 52.

In one constructed form of the invention, the three projections 68 were replaced by an annular member ridge formed integrally with the end cap 64 and being continuous except only for an interruption or opening adjacent the opening 24 to provide a passageway for air flow between opening 24 and the air volume centrally inside of the annular member. In that constructed form, the surface of the annular member facing the armature member 48 was flat and about 0.025 inches wide and the diameter was somewhat larger than that of the circular locus of the projections 68, the outer diameter being about the same as the diameter of armature member 44 so as to preclude any significant movement of any part of the armature 44 in the direction of the end cap 64 (towards the left in FIG. 1) during tilting, an arrangement now preferred. As with projections 68, the annular member preferably projects slightly further (e.g., 0.011 inches) from the inner face of the end cap 64 than the valve seat 52 does.

In view of the above description of an exemplary magnetic valve 10 according to this invention, it will now be appreciated that a magnetic valve is provided which can operate with lower flux levels, and consequently, fewer ampere-turns than prior art devices. As a result, a substantial cost savings is achieved. Moreover, it can be seen that the alignment between the resilient member 46 and the valve seats 52 and 56 is not critical, and accordingly, the parts may be manufactured with convenient tolerances and assembly may be economically and easily accomplished. Furthermore, any dimensional variations due to wear also are not critical thereby contributing to the reliability and longevity of the device.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

What is claimed is:

1. A magnetic valve for controlling the flow of fluid in a fluid flow path between sources of differing fluid pressure including a valve body therefor comprising a valve seat in the fluid flow path, a generally flat armature member having first and second faces and movable in directions towards and away from said valve seat and having an opening therethrough, said armature member having a preselected thickness adjacent said opening, an elastomeric valve member having a central portion disposed in said opening and movable therein, a first flange portion larger than said opening and overlying a portion of said first face of said armature member, and second flange portion larger than said opening and overlying a portion of said second face of said armature, the distance between said flanges being greater than said preselected thickness, movement of said armature member in one direction applying forces through said first flange to move said valve member in said one direction to mate said central portion of said valve member with said valve seat with continuing movement of said armature member in said one direction flexing said first flange, and movement of said armature member in the other direction applying forces through said second flange to move said valve member in said other direction, and means on at least one of said armature and said valve body for controlling the extent to which said armature member flexes said first flange comprising rigid stop means independent of said valve member for establishing a limit position to the movement of said armature member.

2. The combination of claim 1 further including a second valve seat disposed on the opposite side of said armature member and engaging a portion of said valve member when said armature is in said second position and in which in movement of said armature member towards said second valve seat a portion of said valve member engages said second valve seat and continuing movement of said armature member in a direction towards said second valve seat flexes said second flange.

3. The combination of claim 1 further comprising means including a source of magnetic flux for moving said armature member at least partially in tilting rotation, and for moving at least a portion of said valve member in tilting rotation relative to said valve seat in response to said movement of said armature in tilting rotation.

4. A combination of claim 3 in which the difference in the fluid pressures establishes a force on said valve member when said valve member is mated with said valve seat in a direction tending to retain said valve in mating engagement with said valve seat, and in which said movement of at least a portion of said valve member in tilting rotation initially cracks said valve member from said valve seat at less than the entirety of the area of the engagement between said valve member and said valve seat to reduce said force.

5. The combination of claim 4 in which said valve member is flexible and in which said movement of at least a portion of said valve member in tilting rotation flexes said portion to peel at least a portion thereof from said valve seat.

6. The combination of claim 3 in which a portion of said armature member remains in engagement with a portion of said rigid stop means during a portion of said tilting rotation of said armature.

7. The combination of claim 3 further including a second valve seat, in which said valve member is mateable with said first valve seat when said armature is in one limit position established by said rigid stop means and is mateable with said second valve seat when said valve member is in another limit position established by said rigid stop means.

8. A magnetic valve for controlling the flow of fluid in a fluid flow path between sources of differing fluid pressure including a valve body therefor comprising a valve seat in the fluid flow path, a generally flat armature member movable in directions toward and away from said valve seat, an elastomeric valve member having a central portion which is adapted to mate with said valve seat and flange means in cooperative relationship with said armature member whereby predetermined movement of said armature member away from said valve seat relative to said valve member central portion is provided to apply an inertia force to said valve member through said flange means to urge said valve member away from said valve seat, said armature member being in substantially centered relationship with said valve seat, and a source of magnetic flux for moving said armature member at least partially in tilting rotation from said valve seat and, acting through said flange means, for moving at least a portion of said valve member in tilting rotation relative to said valve seat in response to said movement of said armature member in tilting rotation to pry or peel said valve member from said valve seat, said inertia force, said tilting rotation of said armature member, and said tilting rotation of at least a part of said valve member cooperatively acting to overcome a mating force between said valve member and said valve seat consequent said differing fluid pressures of said sources.

9. The combination of claim 8 in which continuing movement of said armature member toward said valve seat causes flexing of said flange means to thereby establish a mating force between said valve seat and said central portion of said valve member.

10. The combination of claim 9 including means on at least one of said armature and said valve body for controlling the extent to which said armature member flexes said flange means comprising rigid stop means independent of said valve member for establishing a limit position to the movement of said armature member.

11. A magnetic valve for controlling the flow of fluid in a fluid flow path between sources of differing fluid pressure including a valve body therefor comprising a valve seat in the fluid flow path, a generally flat armature member movable in directions toward and away from said valve seat, an elastomeric valve member having a central portion which is adapted to mate with said valve seat and flange means in cooperative relationship with said armature member whereby predetermined movement of said armature member away from said valve seat relative to said valve member central portion is provided to apply an inertia force to said valve member through said flange means to urge said valve member away from said valve seat, said armature member being in substantially centered relationship with said valve seat, and a source of magnetic flux for moving said armature member at least partially in tilting rotation from said valve seat and, acting through said flange means, for moving at least a portion of said valve member in tilting rotation relative to said valve seat in response to said movement of said armature member in tilting rotation to pry or peel said valve member from said valve seat, said armature member being adapted for movement toward said valve seat whereby said valve member is mated with said valve seat and further being adapted for continuing movement toward said valve seat to cause flexing of said flange to establish a mating force between said valve seat and said valve member, and means on at least one of said armature and said valve body for controlling the extent to which said armature member flexes said flange means comprising rigid stop means independent of said valve member for establishing a limit position to the movement of said armature member.

* * * * *